United States Patent
Hsieh et al.

(10) Patent No.: US 11,582,015 B2
(45) Date of Patent: Feb. 14, 2023

(54) ENHANCEMENT FOR BANDWIDTH PART (BWP) OPERATION TOWARDS SECONDARY CELL (SCELL) DORMANCY INDICATION

(71) Applicant: MEDIATEK INC., Hsin-Chu (TW)

(72) Inventors: Chi-Hsuan Hsieh, Hsin-Chu (TW); Yi-Ju Liao, Hsin-Chu (TW); Wei-De Wu, Hsin-Chu (TW)

(73) Assignee: MediaTek INC., Hsin-Chu (TW)

(*) Notice: Subject to any disclaimer, the term of this patent is extended or adjusted under 35 U.S.C. 154(b) by 57 days.

(21) Appl. No.: 17/198,989

(22) Filed: Mar. 11, 2021

(65) Prior Publication Data
US 2021/0320778 A1    Oct. 14, 2021

Related U.S. Application Data

(60) Provisional application No. 63/010,098, filed on Apr. 15, 2020, provisional application No. 63/007,988, filed on Apr. 10, 2020.

(51) Int. Cl.
*H04L 5/00* (2006.01)
*H04L 1/18* (2006.01)
(Continued)

(52) U.S. Cl.
CPC .......... *H04L 5/0098* (2013.01); *H04L 1/1819* (2013.01); *H04L 1/1896* (2013.01);
(Continued)

(58) Field of Classification Search
CPC ... H04L 5/0098; H04L 1/1819; H04L 1/1896; H04L 5/001; H04W 72/042; H04W 72/0453; H04W 36/06; H04W 36/18
See application file for complete search history.

(56) References Cited

U.S. PATENT DOCUMENTS

2019/0357085 A1* 11/2019 Chervyakov ......... H04L 1/0009
2021/0014010 A1*  1/2021 Babaei ................. H04L 1/1642
(Continued)

FOREIGN PATENT DOCUMENTS

CN       111727630 A  *  9/2020  ............ H04L 5/001
WO    WO 2020/047080 A1      8/2018
(Continued)

OTHER PUBLICATIONS

English translation of CN-111727630-A, 2020, Retreived from PE2E Search on Jun. 30, 2022. (Year: 2020).*
(Continued)

*Primary Examiner* — Omar J Ghowrwal
(74) *Attorney, Agent, or Firm* — Imperium Patent Works; Zheng Jin (57) ABSTRACT

A method for enhancing Bandwidth Part (BWP) operation towards Secondary Cell (SCell) dormancy indication is proposed. A User Equipment (UE) detects a Downlink Control Information (DCI) format including an SCell dormancy indication that indicates an active BWP change for a serving cell. The UE performs BWP switching for the serving cell in response to the DCI format. The UE stops transmission or reception in the serving cell during a time duration from a slot containing a last symbol of the DCI format, wherein the time duration includes a first period of time of delay for the BWP switching and a second period of time of interruption to other active serving cells.

18 Claims, 6 Drawing Sheets

(51) Int. Cl.
    *H04W 72/04*     (2009.01)
    *H04W 36/06*     (2009.01)
    *H04W 36/18*     (2009.01)
    *H04L 1/1867*    (2023.01)
    *H04L 1/1812*    (2023.01)
    *H04W 72/0453*   (2023.01)

(52) U.S. Cl.
    CPC ............ *H04L 5/001* (2013.01); *H04W 36/06* (2013.01); *H04W 36/18* (2013.01); *H04W 72/042* (2013.01); *H04W 72/0453* (2013.01)

(56) References Cited

U.S. PATENT DOCUMENTS

2021/0168776 A1*   6/2021   Li ..................... H04W 72/042
2022/0191880 A1*   6/2022   Wei .................... H04W 72/044

FOREIGN PATENT DOCUMENTS

WO     WO-2019094781 A9 *  10/2019   ............... H04B 7/02
WO     WO-2020198356 A1 *  10/2020   ........... H04L 1/1671

OTHER PUBLICATIONS

English translation of Applicant's NPL "Taiwan IPO Written Opinion and search report for application 110112704," Jul. 23, 2021, Retrieved from STIC services on Jun. 29, 2022. (Year: 2021).*
Taiwan IPO Written Opinion and search report for application 110112704, dated Jul. 23, 2021, 6 pages. No English translation available.

* cited by examiner

FIG. 1

| μ | NR Slot length (ms) | BWP switch delay T_BWPswitchDelay (slots) | |
|---|---|---|---|
| | | Type 1 | Type 2 |
| 0 | 1 | 1 | 3 |
| 1 | 0.5 | 2 | 5 |
| 2 | 0.25 | 3 | 9 |
| 3 | 0.125 | 6 | 18 |

FIG. 2

| $\mu$ | NR Slot length (ms) | Interruption length X (slots) |
|---|---|---|
| 0 | 1 | 1 |
| 1 | 0.5 | 1 |
| 2 | 0.25 | 3 |
| 3 | 0.125 | 5 |

ENHANCEMENT FOR BANDWIDTH PART (BWP) OPERATION TOWARDS SECONDARY CELL (SCELL) DORMANCY INDICATION

CROSS REFERENCE TO RELATED APPLICATIONS

This application claims priority under 35 U.S.C. § 119 from U.S. Provisional Application No. 63/007,988, entitled "Remaining issues on SCell dormancy behavior", filed on Apr. 10, 2020; U.S. Provisional Application No. 63/010,098, entitled "Remaining issues on SCell dormancy behavior", filed on Apr. 15, 2020, the subject matter of which is incorporated herein by reference.

TECHNICAL FIELD

The disclosed embodiments relate generally to wireless communication, and, more particularly, to method for enhancing Bandwidth Part (BWP) operation towards Secondary Cell (SCell) dormancy indication in 5G New Radio (NR).

BACKGROUND

The wireless communications network has grown exponentially over the years. A long-term evolution (LTE) system offers high peak data rates, low latency, improved system capacity, and low operating cost resulting from simplified network architecture. LTE systems, also known as the 4G system, also provide seamless integration to older wireless network, such as GSM, CDMA and universal mobile telecommunication system (UMTS). In LTE systems, an evolved universal terrestrial radio access network (E-UTRAN) includes a plurality of evolved Node-Bs (eNodeBs or eNBs) communicating with a plurality of mobile stations, referred to as user equipments (UEs). The $3^{rd}$ generation partner project (3GPP) network normally includes a hybrid of 2G/3G/4G systems. The next generation mobile network (NGMN) board, has decided to focus the future NGMN activities on defining the end-to-end requirements for 5G new radio (NR) systems.

In 4G/LTE, a feature called "Carrier Aggregation (CA)" is supported to allow communications between a UE and a base station on multiple aggregated carriers or cells (e.g., a Primary Cell (PCell) and one or more Secondary Cells (SCells)). The design of SCell is to provide more data bandwidth in other carrier frequencies, typically higher frequencies, for boosting up data throughput while the PCell is more for ensuring the coverage. Later, in Rel-15 Enhancing LTE CA Utilization (euCA), a new SCell state, called dormant SCell state, is introduced so that SCells can become inactive for power saving when the data transmission requirement is not high.

In 5G/NR, the dormancy behavior is further implemented at Bandwidth Part (BWP) level. The BWP that supports dormancy behavior for an SCell is referred to as a dormant BWP, where Physical Downlink Control Channel (PDCCH) monitoring occasion is not configured. When compared to LTE, the transition between dormancy behavior and non-dormancy behavior is based on BWP switching, which may effectively reduce the switch delay and UE power consumption. That being said, BWP switching may still cause interruption to other active serving cells.

The SCell dormancy indication can be conveyed by Downlink Control Information (DCI) with different DCI formats for UEs to detect outside and inside the Discontinuous Reception (DRX) active time. When it is inside the DRX active time, the SCell dormancy indication can be carried by DCI with DCI formats used by data scheduling, which is referred to as Case 1 SCell dormancy indication. More recently, in Rel-16 NR, the SCell dormancy indication can also be carried by DCI with DCI formats used by non-data scheduling, which is referred to as Case 2 SCell dormancy indication.

For Case 1 SCell dormancy indication, the UE should also respond to the detected DCI by performing Physical Uplink Shared Channel (PUSCH) transmission or Physical Downlink Shared Channel (PDSCH) reception in the PCell. For Case 2 SCell dormancy indication, the UE should also respond to the detected DCI by transmitting a Hybrid Automatic Repeat Request (HARQ)-Acknowledgement (ACK) response to the PCell. However, 3GPP release 16 specifications have not yet define the time duration in which the UE is not required to transmit or receive in an SCell during BWP switching for the SCell. As a result, the PUSCH transmission or PDSCH reception in Case 1 SCell dormancy indication or the HARQ-ACK response transmission in Case 2 SCell dormancy indication may fall inside the interruption caused by BWP switching.

A solution is sought.

SUMMARY

A method for enhancing Bandwidth Part (BWP) operation towards Secondary Cell (SCell) dormancy indication is proposed. A User Equipment (UE) detects a Downlink Control Information (DCI) format comprising an SCell dormancy indication that indicates an active BWP change for a first serving cell. The UE performs BWP switching for the first serving cell in response to the DCI format. The UE stops transmission or reception in the first serving cell during a time duration from a slot containing a last symbol of the DCI format, wherein the time duration comprises a first period of time of delay for the BWP switching and a second period of time of interruption to other active serving cells.

In one embodiment, the DCI format is a non-scheduling DCI using DCI format 1_1. The UE further transmits a response to a Primary Cell (PCell) after the time duration in response to the DCI format. The response may be a Hybrid Automatic Repeat Request (HARQ) Acknowledgement (ACK).

In another embodiment, the DCI format is a scheduling DCI using DCI format 0_1 or 1_1. The DCI format further comprises a time domain resource assignment field that indicates a slot offset value greater than or equal to the time duration, and the UE performs transmission or reception to or from a PCell according to the slot offset value.

In one example, the SCell dormancy indication further indicates another active BWP change for a second serving cell. The UE performs BWP switching for the second serving cell in response to the DCI format, and stops transmission or reception in the second serving cell during the time duration from the slot containing the last symbol of the DCI format, wherein the first period of time is for multiple BWP switching delay.

In another example, the SCell dormancy indication indicates the active DL BWP change for the first serving cell only, and the first period of time is for single BWP switching delay.

In addition, the UE stops transmission or reception in a PCell during the time duration from the slot next to the slot containing the last symbol of the DCI format.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
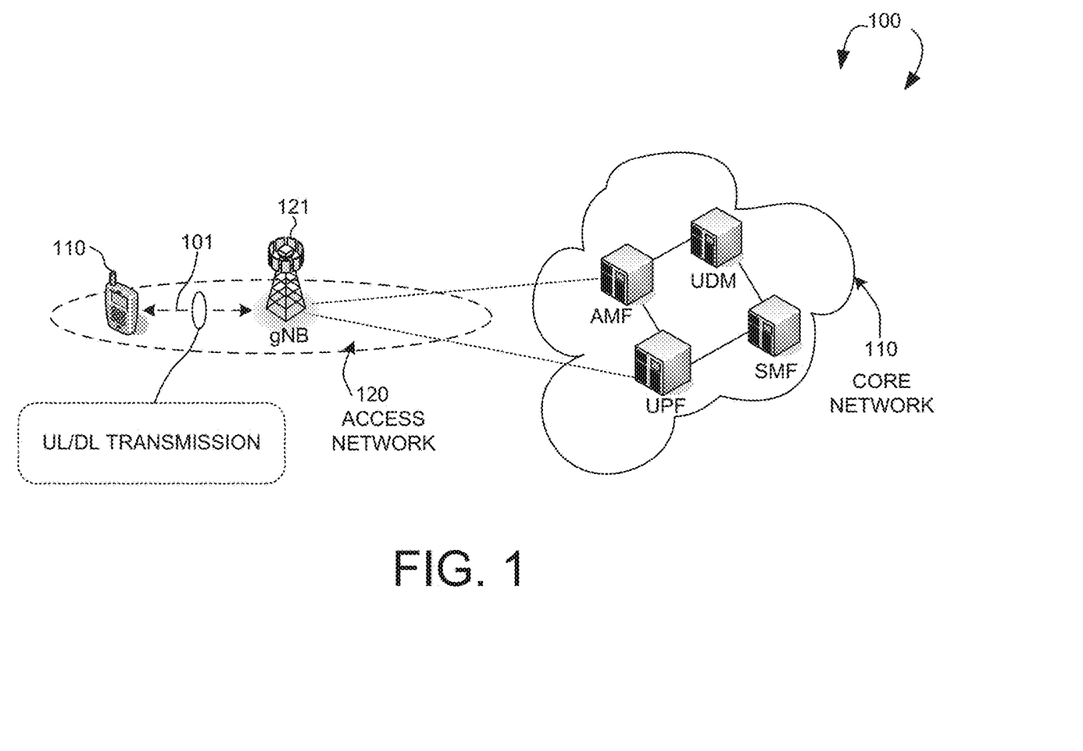
FIG. 1 illustrates an exemplary 5G new radio (NR) network 100 supporting SCell dormancy indication in accordance with aspects of the current invention.

FIG. 1 illustrates an exemplary 5G new radio (NR) network 100 supporting SCell dormancy indication in accordance with aspects of the current invention. The 5G NR network 100 comprises a user equipment (UE) 110 communicatively connected to a gNB 121 operating in a licensed band (e.g., 30 GHz-300 GHz for mmWave) of an access network 120 which provides radio access using a Radio Access Technology (RAT) (e.g., the 5G NR technology). The access network 120 is connected to a 5G core network 130 by means of the NG interface, more specifically to a User Plane Function (UPF) by means of the NG user-plane part (NG-u), and to a Mobility Management Function (AMF) by means of the NG control-plane part (NG-c). One gNB can be connected to multiple UPFs/AMFs for the purpose of load sharing and redundancy. The UE 110 may be a smart phone, a wearable device, an Internet of Things (IoT) device, and a tablet, etc. Alternatively, UE 110 may be a Notebook (NB) or Personal Computer (PC) inserted or installed with a data card which includes a modem and RF transceiver(s) to provide the functionality of wireless communication.

The gNB 121 may provide communication coverage for a geographic coverage area in which communications with the UE 110 is supported via a communication link 101. The communication link 101 between the gNB 121 and the UE 110 may utilize one or more frequency carriers to form one or more cells (e.g., a PCell and one or more SCells). The communication link 101 shown in the 5G NR network 100 may include uplink transmissions from the UE 110 to the gNB 121 (e.g., on the Physical Uplink Control Channel (PUCCH) or Physical Uplink Shared Channel (PUSCH)) or downlink transmissions from the gNB 121 to the UE 110 (e.g., on the Physical Downlink Control Channel (PDCCH) or Physical Downlink Shared Channel (PDSCH)).

In accordance with one novel aspect, the UE 110 may monitor the PDCCH on the primary frequency carrier (i.e., the PCell) outside or inside the DRX active time (e.g., configured by the gNB 121), to receive DCI on PCell/SCell with an SCell dormancy indication, including Case 1 SCell dormancy indication and Case 2 SCell dormancy indication. The SCell dormancy indication may include one or more bits (also referred to as SCell dormancy indication bits), each of which indicates an active Downlink (DL) BWP change (e.g., in or out of a dormant BWP) for a group of SCells or for a configured SCell. For example, X2 (e.g., RRC configured with value=0~5) bits may be introduced to the DCI for Case 1 SCell dormancy indication, wherein each bit may represent SCell dormancy indication for a respective SCell group; or a bit map of length N1 (e.g., N1≤15) may be introduced to the DCI for Case 2 SCell dormancy indication, wherein each bit represents SCell dormancy indication for a respective one of a number of configured SCells. For Case 1 SCell dormancy indication, the UE 110 may avoid transmitting UL/DL data to the PCell during the time duration of interruption caused by the SCell(s) BWP switching. For Case 2 SCell dormancy indication, the UE 110 may avoid transmitting a response to the PCell during the time duration of interruption caused by the SCell(s) BWP switching. In particular, the time duration comprises a first period of time of delay for the BWP switching and a second period of time of interruption to other active serving cells. For example, the first period of time may be denoted as $T_{MultipleBWPSwitchDelay}$, and the second period of time may be denoted as X slots.

In one embodiment, the DCI with SCell dormancy indication is received inside the DRX active time and is carried in a non-scheduling DCI using DCI format 1_1 (i.e., Case 2 SCell dormancy indication). The UE 110 may transmit the response to the PCell after the time duration (e.g., after $T_{MultipleBWPSwitchDelay}+X$ slots) from the slot containing the last symbol of the DCI format. The response may include a Hybrid Automatic Repeat Request (HARQ) Acknowledgement (ACK).

In another embodiment, the DCI with SCell dormancy indication is received inside the DRX active time and is carried in a scheduling DCI using DCI format 0_1 or 1_1 (i.e., Case 1 SCell dormancy indication). Specifically, the DCI format comprises a time domain resource assignment field that indicates a slot offset value greater than or equal to the time duration. The UE 110 may perform transmission (e.g., PUSCH transmission) or reception (e.g., PDSCH reception) to or from the PCell according to the slot offset value. That is, the PUSCH transmission or PDSCH reception to/from the PCell is scheduled after the time duration (e.g., after $T_{MultipleBWPSwitchDelay}+X$ slots) from the slot containing the last symbol of the DCI format.

To further clarify, the first period of time of delay for multiple BWP switching may be configured as follows in equation (1).

$$T_{MultipleBWPSwitchDelay}=T_{BWPswitchDelay}+1\text{slot}+D*(N-1) \quad (1)$$

Figure 2:
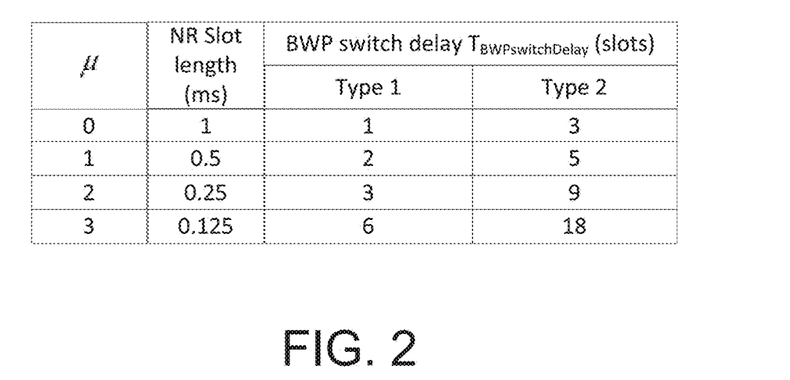
FIG. 2 illustrates an exemplary configuration of a single BWP switching delay in accordance with aspects of the current invention.

In equation (1), $T_{BWPswitchDelay}$ is the single-CC BWP switch delay defined in 3GPP TS38.133. Detailed configuration of $T_{BWPswitchDelay}$ is illustrated in FIG. 2. D represents the incremental delay for BWP switch processing on additional Component Carriers (CCs) based on UE's capability. For Type 1 UE, D=100 µs or 200 µs; for Type 2 UE, D=200 µs, 400 µs, 800 µs, or 1000 µs. For UE which is capable of per-Frequency Range (FR) gap, and no BWP switch involves Subcarrier Spacing (SCS) change, N is the number of simultaneous BWP switching on CCs within the same frequency range; For UE which is not capable of per-FR gap, or the BWP switches on multiple CCs involves SCS changing, N is the number of simultaneous BWP switching on both FR.

Figure 3:
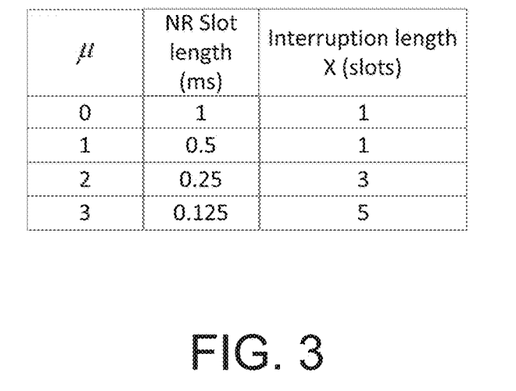
FIG. 3 illustrates an exemplary configuration of an interruption length caused by BWP switching in accordance with aspects of the current invention.

In addition, the second period of time of interruption to other active serving cells may be configured according to 3GPP TS38.133, as illustrated in FIG. 3.

Figure 4:
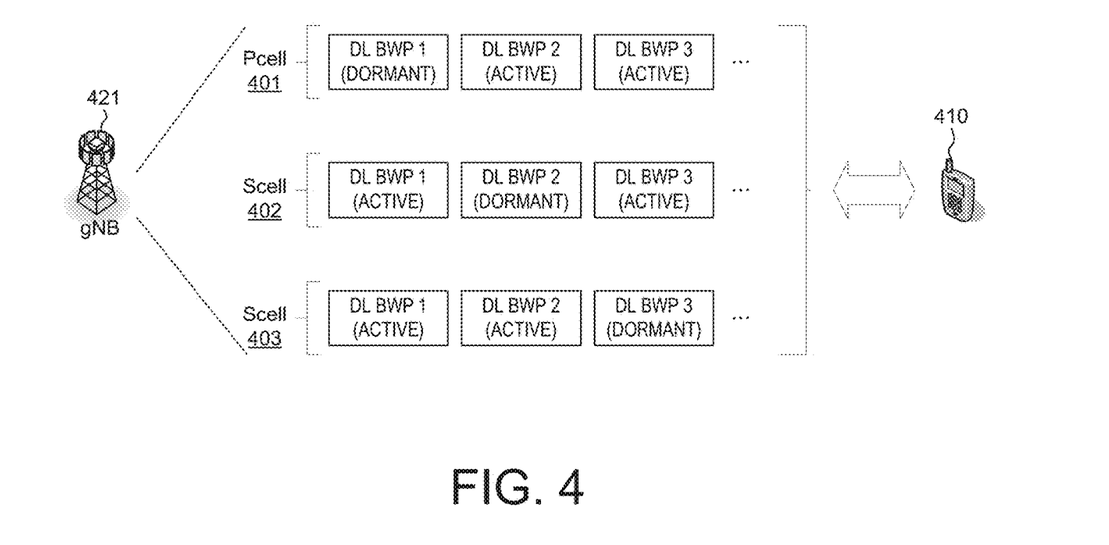
FIG. 4 illustrates an exemplary BWP configuration of a communication link between a gNB and a UE in accordance with aspects of the current invention.

FIG. 4 illustrates an exemplary BWP configuration of a communication link between a gNB and a UE in accordance with aspects of the current invention. The gNB 421 may communicate (e.g, DL communication) with the UE 410 on multiple cells by carrier aggregation, and the multiple cells may include a PCell 401, an SCell 402, and an SCell 403. For each serving cell, a plurality of DL BWPs may be configured, wherein only one DL BWP is dormant, while the other DL BWPs are active (non-dormant). Specifically, a BWP that supports dormancy behavior for an SCell is referred to as a dormant BWP, where PDCCH monitoring occasion is not configured. That is, the UE 410 is not required to perform PDCCH monitoring on the dormant BWP. For example, the UE 410 may be configured to switch in or out of a dormant BWP on the SCell according to DCI with SCell dormancy indication provided by the gNB 421.

Figure 5:
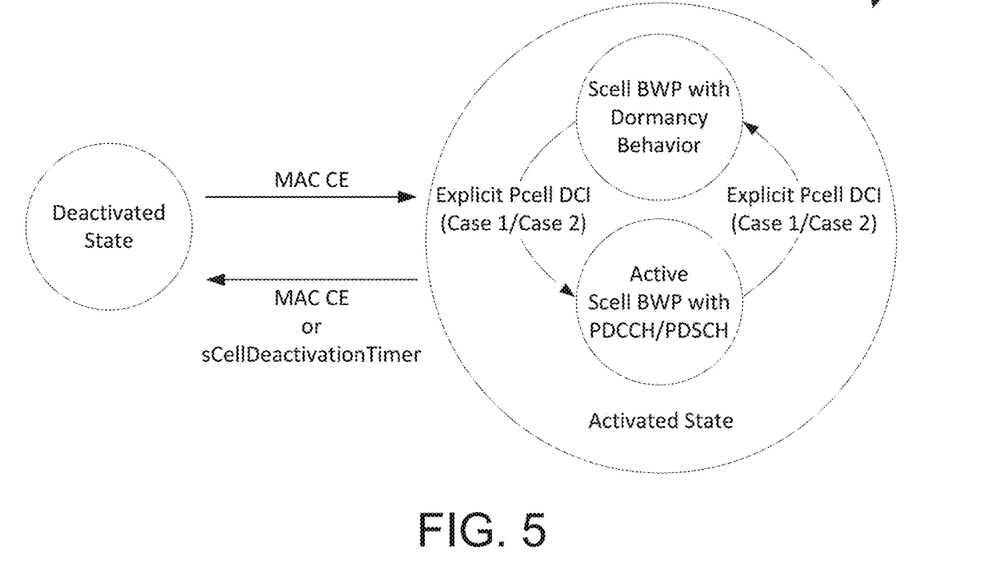
FIG. 5 illustrates an example of a state diagram 500 showing BWP switching in an activated SCell in accordance with aspects of the current invention.

FIG. 5 illustrates an example of a state diagram 500 showing BWP switching in an activated SCell in accordance with aspects of the current invention. For a UE, an SCell may be activated or deactivated by Medium Access Control (MAC) signaling or a deactivation timer. When the SCell is in the activated state, the UE may switch from an active BWP to the dormant BWP after an inactivity timer expires or after receiving DCI with SCell dormancy indication indicating that the UE is to switch to a dormant BWP. Later, when the UE decides to continue communicating with the gNB on the SCell (e.g., based on receiving DCI with SCell dormancy indication for a cross-carrier BWP switch), the UE may switch from the dormant BWP to an active BWP for communicating with the gNB on the SCell.

Figure 6:
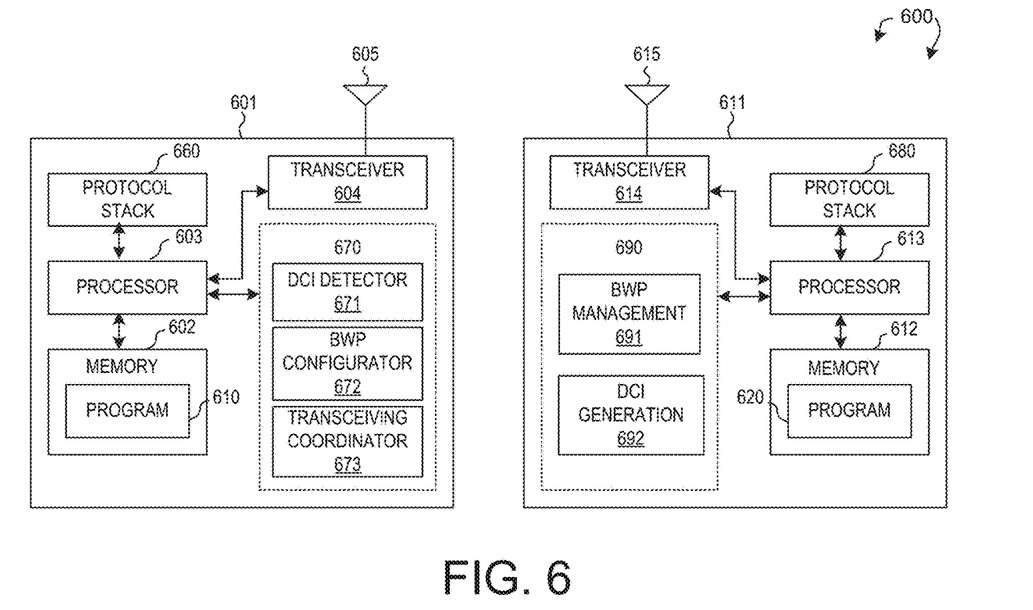
FIG. 6 illustrates simplified block diagrams of wireless devices, e.g., a UE 601 and a gNB 611 in accordance with embodiments of the current invention.

FIG. 6 illustrates simplified block diagrams of wireless devices, e.g., a UE 601 and a gNB 611 in accordance with embodiments of the current invention. The gNB 611 has an antenna 615, which transmits and receives radio signals. A radio frequency (RF) transceiver module 614, coupled with the antenna 615, receives RF signals from the antenna 615, converts them to baseband signals and sends them to the processor 613. The RF transceiver 614 also converts received baseband signals from the processor 613, converts them to RF signals, and sends out to the antenna 615. The processor 613 processes the received baseband signals and invokes different functional modules to perform features in the gNB 611. The memory 612 stores program instructions and data 620 to control the operations of the gNB 611. In the example of FIG. 6, the gNB 611 also includes a protocol stack 680 and a set of control function modules and circuits 690. The protocol stack 680 may include a Non-Access-Stratum (NAS) layer to communicate with an AMF/SMF/MME entity connecting to the core network, a Radio Resource Control (RRC) layer for high layer configuration and control, a Packet Data Convergence Protocol/Radio Link Control (PDCP/RLC) layer, a Media Access Control (MAC) layer, and a Physical (PHY) layer. In one example, the control function modules and circuits 690 include a BWP management circuit 691 that manages the BWP operation associated with PCell and SCell(s) for the UE 601, and a DCI generation circuit 692 that generates DCI with or without SCell dormancy indication based on the parameters used for managing the BWP operation, such as the time duration to avoid the PCell HARQ-ACK response for case 2 SCell dormancy indication or PCell UL/DL data transmission for case 1 SCell dormancy indication falling inside the interruption caused by SCell(s) BWP switching.

Similarly, the UE 601 has a memory 602, a processor 603, and an RF transceiver module 604. The RF transceiver 604 is coupled with the antenna 605, receives RF signals from the antenna 605, converts them to baseband signals, and sends them to the processor 603. The RF transceiver 604 also converts received baseband signals from the processor 603, converts them to RF signals, and sends out to the antenna 605. The processor 603 processes the received baseband signals and invokes different functional modules and circuits to perform features in the UE 601. The memory 602 stores data and program instructions 610 to be executed by the processor 603 to control the operations of the UE 601. Suitable processors include, by way of example, a special purpose processor, a digital signal processor (DSP), a plurality of micro-processors, one or more micro-processor associated with a DSP core, a controller, a microcontroller, application specific integrated circuits (ASICs), file programmable gate array (FPGA) circuits, and other type of integrated circuits (ICs), and/or state machines. A processor in associated with software may be used to implement and configure features of the UE 601.

The UE 601 also includes a protocol stack 660 and a set of control function modules and circuits 670. The protocol stack 660 may include a NAS layer to communicate with an AMF/SMF/MME entity connecting to the core network, an RRC layer for high layer configuration and control, a PDCP/RLC layer, a MAC layer, and a PHY layer. The Control function modules and circuits 670 may be implemented and configured by software, firmware, hardware, and/or combination thereof. The control function modules and circuits 670, when executed by the processor 603 via program instructions contained in the memory 602, interwork with each other to allow the UE 601 to perform embodiments and functional tasks and features in the network.

In one example, the control function modules and circuits 670 include a DCI detector circuit 671 that detects a DCI format with SCell dormancy indication, a BWP configurator circuit 672 that performs BWP switching according to the detected DCI format, and a transceiving coordinator circuit 673 that coordinates the RF transceiver 604 to stop transmission or reception in the indicated SCell during a time duration from the slot containing the last symbol of the detected DCI format.

Figure 7:
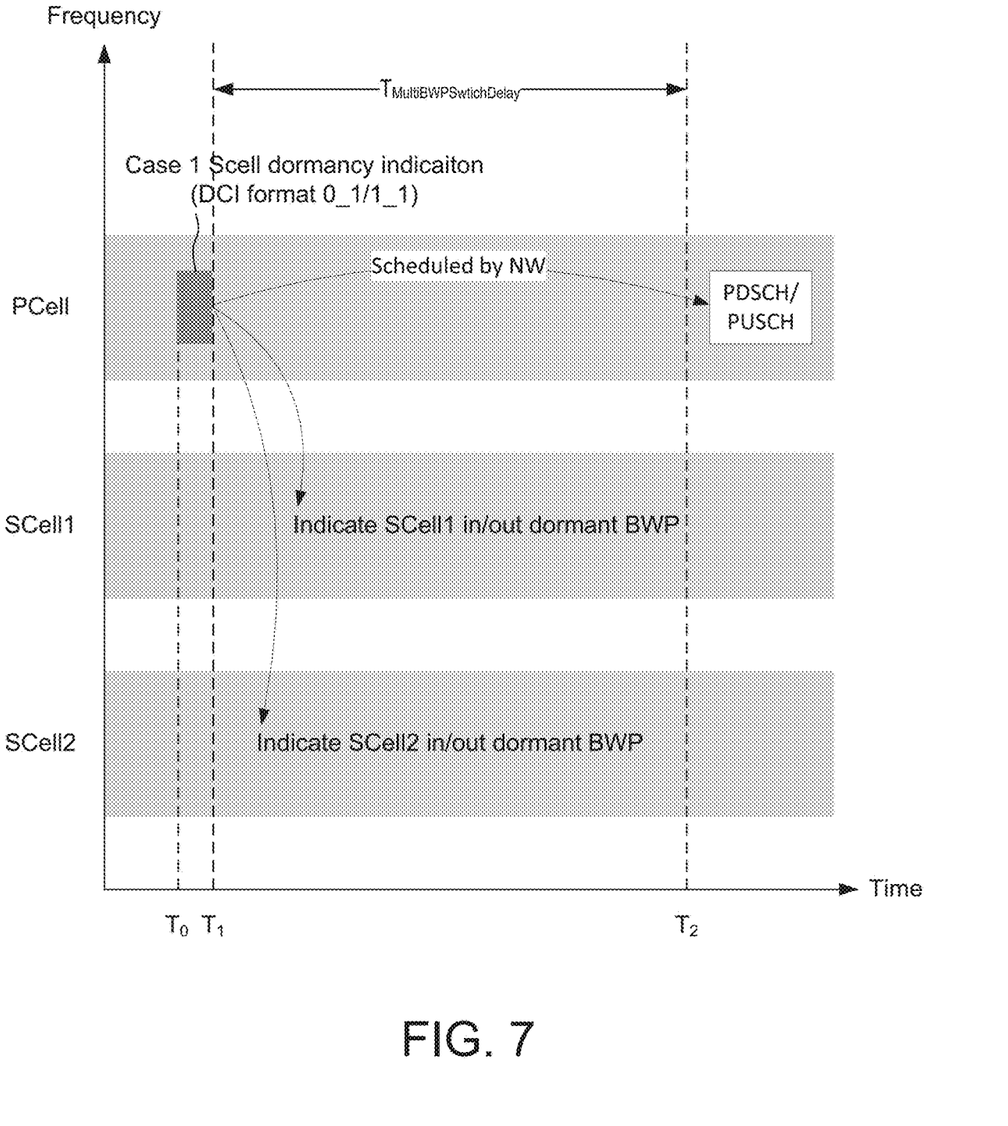
FIG. 7 illustrates BWP operation towards Case 1 SCell dormancy indication in accordance with one novel aspect.

FIG. 7 illustrates BWP operation towards Case 1 SCell dormancy indication in accordance with one novel aspect. At time $T_0$, a UE detects a scheduling DCI (i.e., a DCI with data scheduling) using DCI format 0_1 or 1_1 which comprises a BWP indicator field that indicates in or out of a dormant BWP for SCell1 and SCell2. During a time duration (denoted as $T_{MultiBWPSwitchDelay}$) from the end of the slot (i.e., at time $T_1$) containing the last symbol of the detected DCI format to the beginning of a slot (i.e., at time $T_2$) indicated by the slot offset value of the time domain resource assignment field in the detected DCI format, the UE performs BWP switching in or out of a dormant BWP for SCell1 and SCell2. After the time duration, the UE may perform PUSCH transmission or PDSCH reception on the PCell as scheduled by the network. Note that the UE is not required to perform transmission or reception in any serving cell (including PCell and all SCells) during the time duration.

Figure 8:
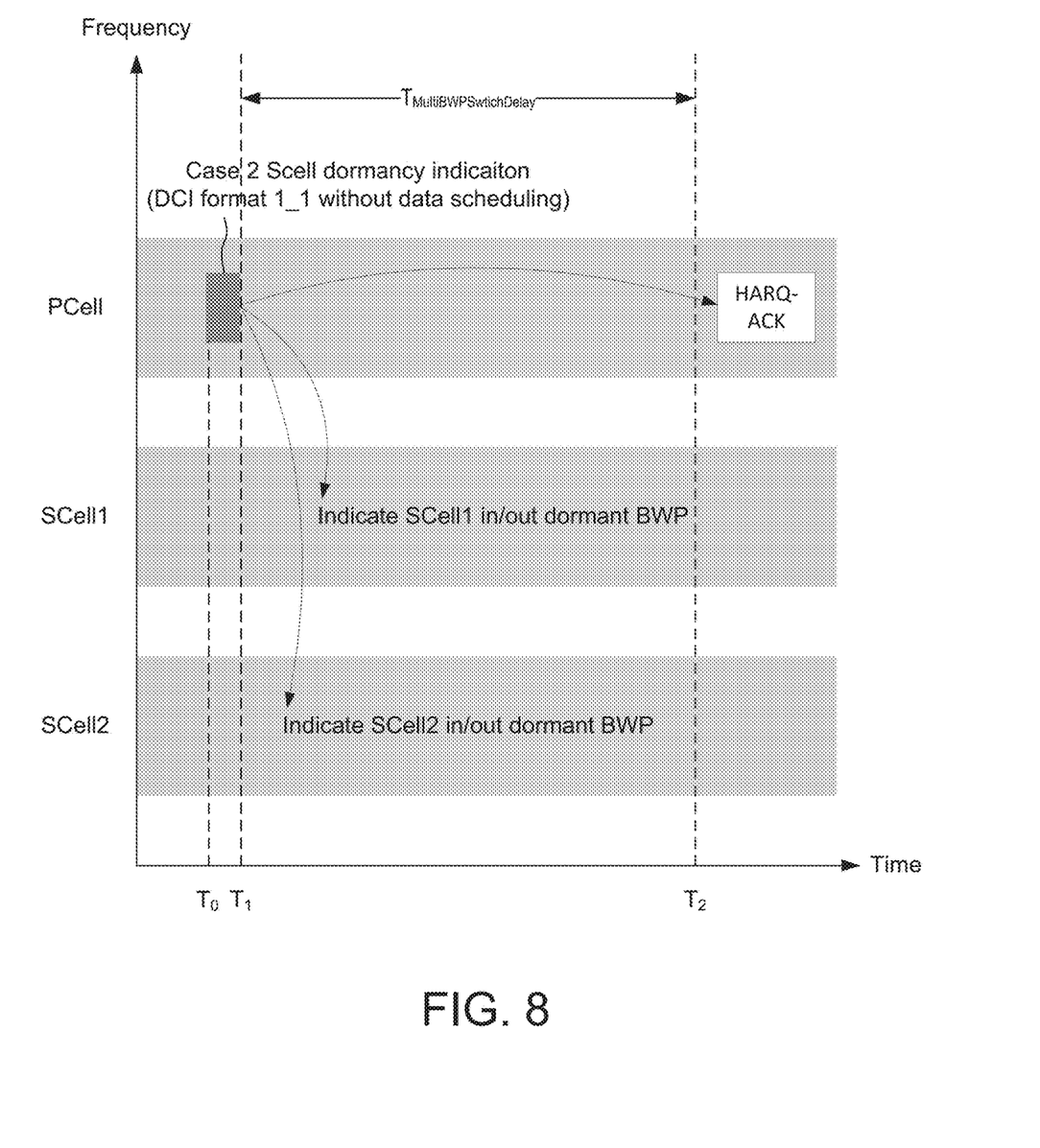
FIG. 8 illustrates BWP operation towards Case 2 SCell dormancy indication in accordance with one novel aspect.

FIG. 8 illustrates BWP operation towards Case 2 SCell dormancy indication in accordance with one novel aspect. At time $T_0$, a UE detects a non-scheduling DCI (i.e., a DCI without data scheduling) using DCI format 1_1 which comprises a BWP indicator field that indicates in or out of a dormant BWP for SCell1 and SCell2. During a time duration (denoted as $T_{MultiBWPSwitchDelay}$) from the end of the slot (i.e., at time $T_1$) containing the last symbol of the detected DCI format to the beginning of a slot (i.e., at time $T_2$) indicated by the slot offset value of the time domain resource assignment field in the detected DCI format, the UE performs BWP switching in or out of a dormant BWP for SCell1 and SCell2. After the time duration, the UE may transmit an HARQ-ACK to the PCell for acknowledging the reception of the SCell dormancy indication. Note that the UE is not required to perform transmission or reception in any serving cell (including PCell and all SCells) during the time duration.

Figure 9:
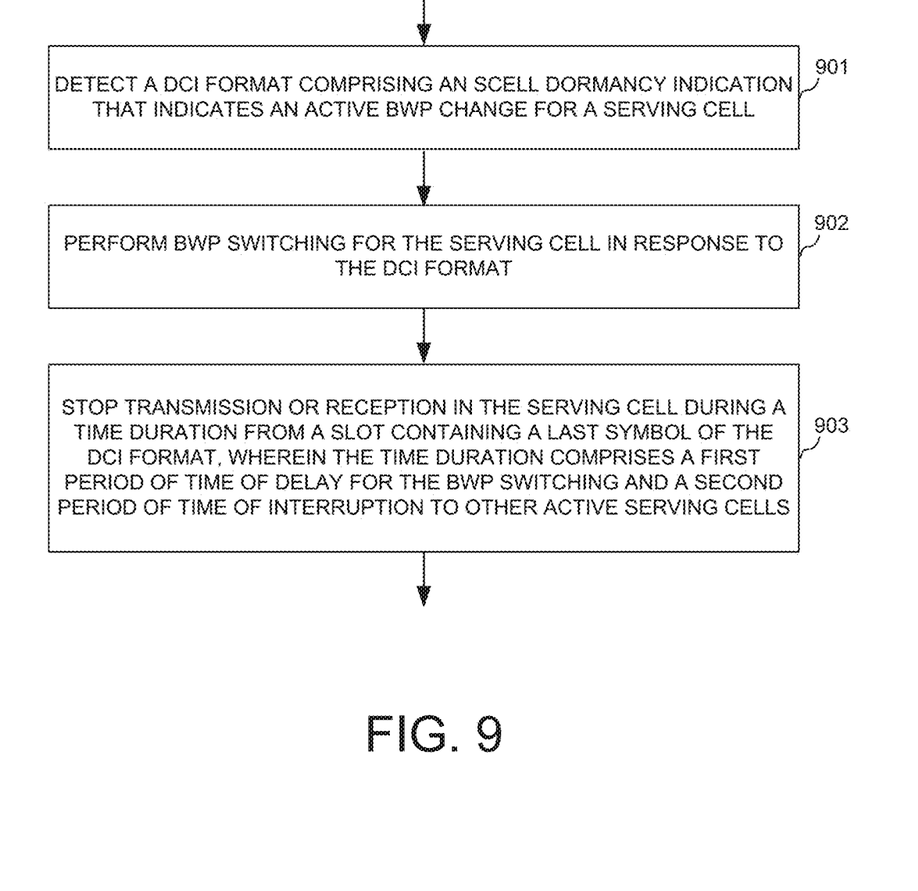
FIG. 9 illustrates a flow chart of a method for enhancing BWP operation towards SCell dormancy indication in accordance with one novel aspect.

FIG. 9 illustrates a flow chart of a method for enhancing BWP operation towards SCell dormancy indication in accordance with one novel aspect. In step 901, a UE detects a DCI format comprising an SCell dormancy indication that indicates an active BWP change for a serving cell. In step 902, the UE performs BWP switching for the serving cell in response to the DCI format. In step 903, the UE stops transmission or reception in the serving cell during a time duration from a slot containing a last symbol of the DCI format, wherein the time duration comprises a first period of time of delay for the BWP switching and a second period of time of interruption to other active serving cells.

In one embodiment, the DCI format is a non-scheduling DCI using DCI format 1_1 (i.e., Case 2 SCell dormancy indication). The UE may transmit a response (e.g., an HARQ-ACK) to the PCell after the time duration by the UE in response to the DCI format.

In another embodiment, the DCI format is a scheduling DCI using DCI format 0_1 or 1_1 (i.e., Case 1 SCell dormancy indication). The UE may perform transmission or reception to or from the PCell according to the slot offset value of the time domain resource assignment field in the DCI format.

In one example, the SCell dormancy indication indicates the active BWP change for the first serving cell only, and the first period of time is for single BWP switching delay (e.g., the $T_{BWPswitchDelay}$ defined in 3GPP TS38.133).

In another example, the SCell dormancy indication further indicates an active BWP change for a second serving cell. The UE may perform BWP switching for the second serving cell in response to the DCI format, and stop transmission or reception in the second serving cell during the time duration from the slot containing the last symbol of the DCI format, wherein the first period of time is for multiple BWP switching delay (e.g., the $T_{MultiBWPSwitchDelay}$ defined in 3GPP TS38.133).

Note that the UE is not required to perform transmission or reception in any serving cell (including PCell and all SCells) during the time duration.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, comprising:
   detecting a Downlink Control Information (DCI) format by a User Equipment (UE), wherein the DCI format comprises a secondary cell (SCell) dormancy indication that indicates an active bandwidth part (BWP) change for a first serving cell;
   performing BWP switching for the first serving cell by the UE in response to the DCI format;
   stopping transmission or reception in the first serving cell during a time duration from a slot containing a last symbol of the DCI format by the UE, wherein the time duration comprises a first period of time of delay for the BWP switching and a second period of time of interruption to other active serving cells; and
   stopping transmission or reception in a primary cell (PCell) during the time duration from a slot next to the slot containing the last symbol of the DCI format by the UE.

2. The method of claim 1, wherein the DCI format is a non-scheduling DCI using DCI format 1_1.

3. The method of claim 2, further comprising:
   transmitting a response to a Primary Cell (PCell) after the time duration by the UE in response to the DCI format.

4. The method of claim 3, wherein the response is a Hybrid Automatic Repeat Request (HARQ) Acknowledgement (ACK).

5. The method of claim 1, wherein the DCI format is a scheduling DCI using DCI format 0_1 or 1_1.

6. The method of claim 5, wherein the DCI format further comprises a time domain resource assignment field that indicates a slot offset value greater than or equal to the time duration.

7. The method of claim 6, further comprising:
   performing transmission or reception to or from a primary cell (PCell) according to the slot offset value by the UE.

8. The method of claim 1, wherein the SCell dormancy indication further indicates an active BWP change for a second serving cell, and the method further comprises:
   performing BWP switching for the second serving cell by the UE in response to the DCI format; and
   stopping transmission or reception in the second serving cell during the time duration from the slot containing the last symbol of the DCI format by the UE, wherein the first period of time is for multiple BWP switching delay.

9. The method of claim 1, wherein the SCell dormancy indication indicates the active BWP change for the first serving cell only, and the first period of time is for single BWP switching delay.

10. A User Equipment (UE), comprising:
    a Downlink Control Information (DCI) detector that detects a DCI format comprising a secondary cell (SCell) dormancy indication that indicates an active bandwidth part (BWP) change for a first serving cell;
    a BWP configurator that performs BWP switching for the first serving cell in response to the DCI format;
    a processor that is coupled to the DCI detector and the BWP configurator and controls the operations of the DCI detector and the BWP configurator; and
    a transceiver that is coupled to the processor and stops transmission or reception in the first serving cell during a time duration from a slot containing a last symbol of the DCI format, wherein the time duration comprises a first period of time of delay for the BWP switching and a second period of time of interruption to other active serving cells, wherein the transceiver further stops transmission or reception in a primary cell (PCell) during the time duration from a slot next to the slot containing the last symbol of the DCI format.

11. The UE of claim 10, wherein the DCI format is a non-scheduling DCI using DCI format 1_1.

12. The UE of claim 11, wherein the transceiver further transmits a response to a Primary Cell (PCell) after the time duration in response to the DCI format.

13. The UE of claim 12, wherein the response is a Hybrid Automatic Repeat Request (HARQ) Acknowledgement (ACK).

14. The UE of claim 10, wherein the DCI format is a scheduling DCI using DCI format 0_1 or 1_1.

15. The UE of claim 14, wherein the DCI format comprises a time domain resource assignment field that indicates a slot offset value greater than or equal to the time duration.

16. The UE of claim 15, wherein the transceiver further performs transmission or reception to or from a primary cell (PCell) according to the slot offset value.

17. The UE of claim 10, wherein the SCell dormancy indication further indicates an active BWP change for a second serving cell; and the BWP configurator further performs BWP switching for the second serving cell in response to the DCI format, and stops transmission or reception in the second serving cell during the time duration from the slot containing the last symbol of the DCI format, wherein the first period of time is for multiple BWP switching delay.

18. The UE of claim 10, wherein the SCell dormancy indication indicates the active BWP change for the first serving cell only, and the first period of time is for single BWP switching delay.

* * * * *